United States Patent [19]

den Hollander

[11] Patent Number: 4,510,527
[45] Date of Patent: Apr. 9, 1985

[54] HORIZONTAL DEFLECTION PHASING ARRANGEMENT

[75] Inventor: Willem den Hollander, Schlieren, Switzerland

[73] Assignee: RCA Corporation, Princeton, N.J.

[21] Appl. No.: 479,446

[22] Filed: Mar. 28, 1983

[51] Int. Cl.³ .................... H04N 5/04; H01J 29/56
[52] U.S. Cl. ................................. 358/158; 315/371
[58] Field of Search .............. 358/158, 159; 315/397, 315/408, 371

[56] References Cited

U.S. PATENT DOCUMENTS

| | | | |
|---|---|---|---|
| 3,891,800 | 6/1975 | Janssen et al. | 178/69.5 |
| 4,228,462 | 10/1980 | van Straaten | 358/158 |
| 4,321,511 | 3/1982 | Willis | 315/387 |
| 4,327,376 | 4/1982 | Balaban et al. | 358/159 |
| 4,385,263 | 5/1983 | Luz et al. | 315/411 |

Primary Examiner—John C. Martin
Assistant Examiner—David E. Harvey
Attorney, Agent, or Firm—Paul J. Rasmussen; Peter M. Emanuel; Scott J. Stevens

[57] ABSTRACT

A frequency and phase control circuit for a television receiver comprises a first phase detector for adjusting the frequency of the horizontal oscillator in response to horizontal sync pulses. A second phase detector maintains a predetermined phase relationship between the deflection circuit switching signals and a pulse indicative of the amplitude zero crossing of the horizontal deflection current. The zero crossing signal is derived from a transformer in series with the horizontal deflection winding. The transformer is normally magnetically saturated by the deflection current, except when the deflection current amplitude is close to zero. A voltage is then developed across the transformer secondary windings, producing the zero crossing pulse.

6 Claims, 3 Drawing Figures

HORIZONTAL DEFLECTION PHASING ARRANGEMENT

This invention relates to deflection circuits for television receivers and in particular to horizontal deflection frequency and phase control circuits which control the timing of the horizontal scan lines.

Proper timing of the horizontal lines scanned by a horizontal deflection circuit of a television receiver is necessary to insure proper vertical alignment of the video information present in each horizontal line. If this does not occur, the picture may appear to jitter or shift horizontally. Automatic frequency and phase control circuitry, such as described in U.S. Pat. No. 4,327,376 in the names of S. A. Steckler and A. R. Balaban, and entitled "Dual Phase-Control Loop Horizontal Deflection Synchronizing Circuit", acts to maintain a constant interval between the horizontal sync and horizontal retrace pulses. In this manner, horizontal phase shifts which occur in the horizontal oscillator or output circuits will therefore be compensated such that the horizontal retrace pulses act as reliable references for the position of spots along the horizontal lines on the screen.

The horizontal retrace pulses are normally obtained from a winding on the high voltage transformer. Changes in electron beam current and the presence of side pincushion distortion correction circuitry may cause the amplitude, shape or duration of the horizontal retrace pulses to change. This reduces the effectiveness of the horizontal retrace pulses as references for the horizontal scan lines. For example, changes in electron beam current due to scene brightness changes may cause the video information to appear to shift horizontally. Side pincushion correction circuitry may cause vertical lines to appear bowed or bent. The present invention is directed to an arrangement for providing a horizontal scan reference that is not affected by changes in receiver operating conditions.

In accordance with the present invention, a frequency and phase control circuit is provided for a television receiver incorporating horizontal deflection circuitry which produces a horizontal deflection signal having positive and negative amplitude portions. The frequency and phase control circuit comprises a source of horizontal rate synchronizing pulses, and a horizontal rate oscillator producing an output signal. A frequency control circuit adjusts the frequency of the horizontal rate oscillator in response to the synchronizing pulses. A circuit produces a pulse indicative of the zero amplitude crossing of the horizontal deflection signal. A phase control circuit is coupled to the horizontal oscillator and responsive to the zero crossing indicative signal for providing switching signals to the horizontal deflection circuit having a predetermined phase relationship with respect to the zero crossing indicative signal.

In the accompanying drawing.

Figure 1:
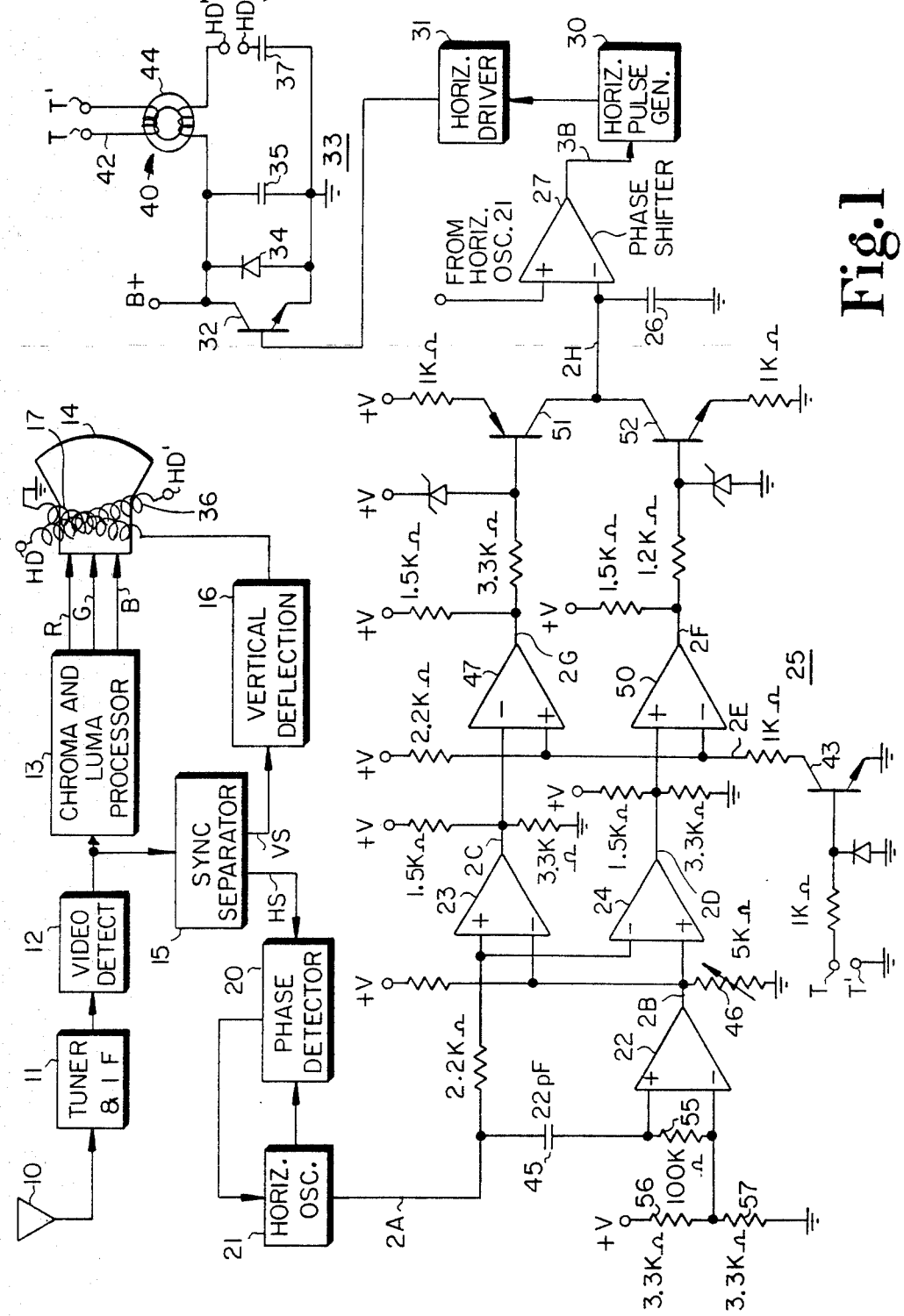
FIG. 1 is a schematic and block diagram of a portion of a television receiver illustrating the frequency and phase control circuit of the present invention.

Referring to FIG. 1, there is shown a portion of a color television receiver in which an RF modulated television signal is received by an antenna 10 and applied to a tuner and intermediate frequency (IF) circuit 11. Circuit 11 heterodynes the RF frequency signal with the tuner oscillator signal to produce the IF signal, which is then amplified. The amplified IF signal is demodulated by a video detector 12 to form a composite video signal comprising luminance, chrominance and synchronizing information.

The composite video signal is applied to chrominance and luminance signal processing circuitry 13, which derives the red, green and blue (R,G,B) signals for driving a kinescope 14, and to a synchronizing pulse separator 15 which removes the horizontal and vertical synchronizing pulses from the composite video signal.

The vertical synchronizing pulses on conductor VS are applied to vertical deflection circuitry 16 which produces the desired properly synchronized vertical deflection or scanning current in vertical deflection winding 17 disposed about kinescope 14. The horizontal synchronizing pulses on conductor HS are applied to one input of a phase detector 20 which has a second input coupled to a horizontal rate oscillator 21. The phase detector 20 compares the frequency of the oscillator output signal to the frequency of the horizontal sync pulses and adjusts the oscillator frequency so that the two frequencies are the same.

Figure 2:
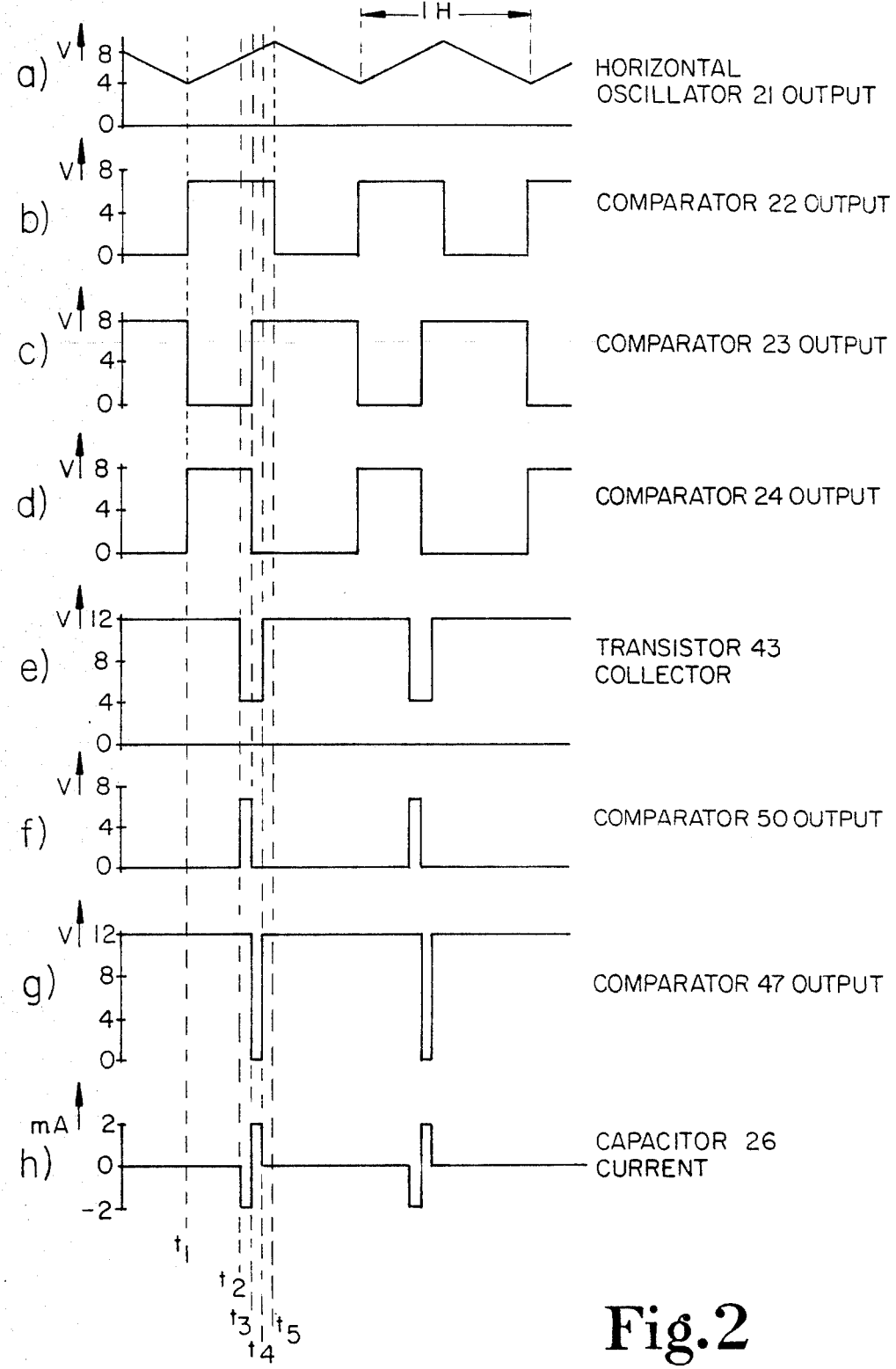
FIG. 2 illustrates waveforms a-h associated with the circuit shown in FIG. 1, with the location of each waveform in FIG. 1 identified by its corresponding letter.

The output of horizontal oscillator 21, shown by the waveform of FIG. 2a, is applied to comparators 22, 23 and 24 of a phase detector 25, the operation of which will be described later. The output of phase detector 25 is applied to phase shifting circuitry 27. The operation of phase detector 25 determines the voltage across capacitor 26 which is applied to one input of phase shifting circuitry 27. The other input of phase shifting circuitry 27 is coupled to horizontal oscillator 21. Phase shifting circuitry 27 comprises a comparator which, in the orientation shown, produces a positive output pulse when the level of the horizontal oscillator output voltage A exceeds the voltage across capacitor 26. Thus, the timing of the beginning of the output pulse is determined by the capacitor 26 voltage. Phase shifting circuitry 27 is coupled to horizontal pulse generator 30 comprising a monostable multivibrator which generates fixed duration horizontal rate trigger pulses for horizontal driver circuit 31. The timing of these horizontal rate trigger pulses is determined by the output from phase shifting circuitry 27. Horizontal driver circuit 31 in turn provides switching signals to the gate of a horizontal output transistor 32 of a horizontal output circuit 33. Horizontal output circuit 33 is powered from a regulated supply, designated B+, of the order of 127 volts dc, and comprises a damper diode 34, a retrace capacitor 35, a horizontal deflection winding 36, located about the kinescope 14 and coupled between terminals HD and HD', and an S-shaping capacitor 37. Horizontal output circuit 33 generates horizontal deflection current in deflection winding 36. Phase detector 25 and phase shifting circuitry 27 cooperate to adjust the frequency and phase of the trigger pulses applied to horizontal driver circuit 31 in order to maintain proper synchronization between the composite video signal picture information and the horizontal deflection current in horizontal deflection winding 36.

A transformer 40 has its primary winding 41 in series with horizontal deflection winding 36 and its secondary winding 42 (with terminals designated T and T') coupled between ground and the base of a transistor 43 of phase detector 25. Transformer 40 illustratively comprises a magnetically permeable toroidal core 44 that is in saturation during substantially all of the horizontal deflection interval due to the flow of horizontal deflection current in its primary winding 41. When the deflection current amplitude becomes close to zero, i.e., when the scanning electron beams are at the center of the kinescope display screen, the magnetically permeable core 44 comes out of saturation and a voltage pulse is developed across the secondary winding 42. Transformer 40 therefore acts as a horizontal deflection current zero-crossing detector. The zero crossing indicative signal developed across secondary winding 42 is applied to phase detector 25 via the base of transistor 43.

In accordance with the present invention, phase detector or comparator 25 receives inputs from horizontal oscillator 21 and zero crossing transformer 40. Comparator 22, along with its associated components including resistors 55, 56 and 57, and capacitor 45, acts to differentiate the output signal from horizontal oscillator 21 to produce a bi-level signal at the output of comparator 22, as shown in FIG. 2b. This signal is applied to the inverting and noninverting inputs, respectively, of comparators 23 and 24, which also receive the signal from horizontal oscillator 21 at their other inputs Comparators 23 and 24 produce output signals which, as shown in FIGS. 2c and 2d, respectively, are similarly timed but opposite in their polarity. The point in time $t_3$ at which the comparators switch output state may be adjusted via variable resistor 46, which sets the reference voltage of comparators 23 and 24. The output of comparator 23 is applied to the inverting input of a comparator 47 and the output of comparator 24 is applied to the noninverting input of a comparator 50.

The zero crossing indicative pulses from transformer 40 appear at the collector of transistor 43 as the waveform shown in FIG. 2e, which is coupled to the noninverting input of comparator 47 and to the inverting input of comparator 50. Comparator 47 compares the signals illustrated by the waveforms shown in FIGS. 2c and 2e to produce a signal having a waveform as shown in FIG. 2g, which is applied to the base of a transistor 51. Comparator 50 compares the signals illustrated by the waveforms of FIGS. 2d and 2e to produce a signal having a waveform as shown in FIG. 2f, which is applied to the base of a transistor 52. The collectors of transistors 51 and 52 are coupled together, forming a terminal which is coupled to capacitor 26 and to the junction of one input of phase shifting circuitry 27.

The output signals produced by comparators 47 and 50 act to gate their respective transistors 51 and 52 into conduction at times $t_2$ and $t_3$, respectively. Conduction of transistor 51 from time $t_2$ to time $t_3$ results in current flow from the +V supply charging capacitor 26. Conduction of transistor 52 from time $t_3$ to time $t_4$ results in a discharge of capacitor 26 through transistor 52 to ground. The charge and discharge current of capacitor 26 is shown by the waveform in FIG. 2h.

Figure 3:
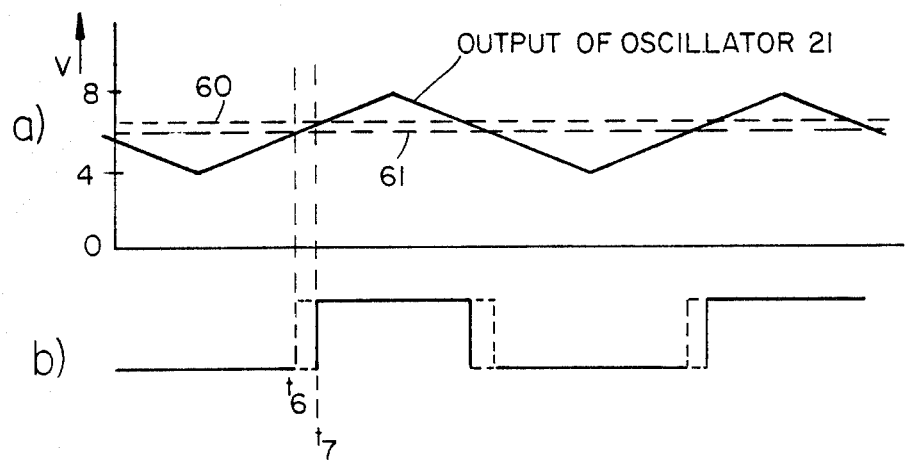
FIG. 3 also illustrates waveforms associated with the circuit of FIG. 1.

When the zero crossing reference pulse from transformer 40 is in phase with the signal from horizontal oscillator 21, the current flow from time $t_2$ to time $t_3$ will equal the current flow from time $t_3$ to time $t_4$, resulting in the average voltage across capacitor 26, shown, for example, by dashed line 60 in FIG. 3a, remaining the same. The timing of the beginning of the comparison pulse output signal from time $t_7$ in FIG. 3b from phase shifting circuitry 27 will also remain the same. If the zero crossing reference pulse is not in phase with the horizontal oscillator signal, the charge and discharge currents for capacitor 26 will be different, thereby changing the voltage across capacitor 26, which in turn changes the reference voltage, shown as dashed line 61 in FIG. 3a, that is applied to phase shifting circuitry 27. This causes the phase or timing of the beginning of the comparison pulse produced by phase shifting circuitry 27 to change, for example, from time $t_7$ to time $t_6$ in FIG. 3b, thereby causing the trigger signals produced by horizontal pulse generator 30 and the switching signals produced by the horizontal driver circuit 31 to occur at a time that results in the zero crossing pulses and the horizontal oscillator being brought into a desired phase relationship, with the horizontal driver switching signals and the zero crossing pulses having a predetermined timed relationship. Horizontal oscillator 21, phase detector 20 and phase shifting circuitry 27 are conventional in design and may form a part of an integrated circuit, for example, a horizontal oscillator integrated circuit identified by the designation TDA 2590.

By referencing the phase of the horizontal oscillator to a deflection current zero crossing reference pulse, variations in beam current loading or the presence of side pincushion distortion correction circuitry, which distort the shape and character of the horizontal retrace pulse, do not affect the horizontal oscillator phase such as would occur if the horizontal retrace pulse were used as a reference. The deflection current zero crossing produces a constant position reference pulse which results in distortion-free vertical lines independent of changes in receiver operating conditions.

What is claimed is:

1. A frequency and phase control circuit for a television receiver incorporating horizontal deflection means providing a horizontal deflection signal having positive and negative amplitude portions in response to horizontal rate switching signals, comprising:
   a source of horizontal rate synchronizing pulses;
   a horizontal rate oscillator providing an output signal;
   frequency control means responsive to said horizontal rate synchronizing pulses for adjusting the frequency of said horizontal rate oscillator;
   means responsive to the occurrence of the zero amplitude crossing of said horizontal deflection signal for producing zero crossing indicative signal pulses; and
   synchronizing control means comprising:
      means coupled to said horizontal rate oscillator and to said zero crossing indicative signal pulse producing means for producing a reference voltage; and
      means coupled to said horizontal rate oscillator and to said reference voltage producing means for providing said horizontal rate switching signals to said horizontal deflection means, said horizontal rate switching signals having a predetermined phase relationship with respect to said zero crossing indicative signal pulses.

2. The arrangement defined in claim 1, wherein said means for producing zero crossing indicative signal pulses comprises a transformer coupled to said horizontal deflection means, said transformer being caused to become magnetically saturated by said horizontal deflection signal during substantially the entire horizontal deflection interval, said transformer becoming magnetically unsaturated when said horizontal deflection signal has substantially zero amplitude.

3. The arrangement defined in claim 1, wherein said horizontal deflection signal comprises horizontal deflection current.

4. The arrangement defined in claim 1, wherein said synchronizing control means comprises phase comparison means for comparing the phase of said horizontal oscillator output signal with the phase of said zero crossing indicative signal pulses, and phase shifting means for varying the time of occurrence of said horizontal rate switching signals to maintain a predetermined phase relationship between said horizontal deflection signal and said zero crossing indicative signal pulses.

5. The arrangement defined in claim 1, wherein said reference voltage producing means comprises phase comparison means producing an output signal having an amplitude level representative of the time of coincidence of said zero crossing indicative signal pulses and said horizontal rate oscillator output signal.

6. A frequency and phase control circuit for a television receiver incorporating horizontal deflection means providing a horizontal deflection signal having positive and negative amplitude portions in response to horizontal rate switching signals, comprising:

a source of horizontal rate synchronizing pulses;

a horizontal rate oscillator providing an output signal;

frequency control means responsive to said horizontal rate synchronizing pulses for adjusting the frequency of said horizontal rate oscillator;

means responsive to the occurrence of the zero amplitude crossing of said horizontal deflection signal for producing zero crossing indicative signal pulses;

synchronizing control means coupled to said horizontal rate oscillator and responsive to said zero crossing indicative signal pulses for providing said horizontal rate switching signals to said horizontal deflection means, said horizontal rate switching signals occurring after a predetermined interval following said zero crossing indicative signal pulses.

* * * * *